United States Patent [19]

Zheng et al.

[11] Patent Number: 5,555,313
[45] Date of Patent: Sep. 10, 1996

[54] METHOD AND APPARATUS FOR CHARACTERIZING THE PERFORMANCE OF A PRINTER OR AN IMAGING SYSTEM

[75] Inventors: Joe Zheng, Brookfield, Conn.; Jiansu Lai, Boston, Mass.

[73] Assignee: United Parcel Service of America, Inc., Atlanta, Ga.

[21] Appl. No.: 487,872

[22] Filed: Jun. 7, 1995

Related U.S. Application Data

[63] Continuation of Ser. No. 295,142, Aug. 24, 1994, abandoned, which is a continuation of Ser. No. 28,308, Mar. 9, 1993, abandoned.

[51] Int. Cl.⁶ .................................................. G06K 9/00
[52] U.S. Cl. ........................ 382/112; 382/168; 382/245
[58] Field of Search ........................... 382/112, 168, 382/280, 286, 291, 141, 190, 171, 172, 245

[56] References Cited

U.S. PATENT DOCUMENTS

| | | | |
|---|---|---|---|
| 3,605,093 | 9/1971 | Parks et al. | 382/21 |
| 3,676,847 | 7/1972 | Partin | 382/25 |
| 4,747,069 | 5/1988 | Grinberg et al. | 364/807 |
| 4,776,464 | 10/1988 | Miller et al. | 209/33 |
| 4,874,936 | 10/1989 | Chandler et al. | 235/494 |
| 4,891,750 | 1/1990 | Pastor et al. | 382/21 |
| 4,896,029 | 1/1990 | Chandler et al. | 235/494 |
| 4,924,078 | 5/1990 | Sant'Anselmo et al. | 235/494 |
| 4,939,354 | 7/1990 | Priddy et al. | 235/456 |
| 5,053,609 | 10/1991 | Priddy et al. | 235/456 |
| 5,173,850 | 12/1992 | Shimura et al. | 364/401 |
| 5,235,652 | 8/1993 | Nally | 382/34 |

FOREIGN PATENT DOCUMENTS

| | | |
|---|---|---|
| 0403376 | 12/1990 | European Pat. Off. . |
| 0414454 | 2/1991 | European Pat. Off. . |
| 2704338 | 10/1994 | France . |

OTHER PUBLICATIONS

Patent Abstracts of Japan, vol. 14 No. 231 (M–0974), 16 May 1990 & JP,A,02 060785 (Omron Tateisi Electron Co.) 1 Mar. 1990.

*Primary Examiner*—Leo Boudreau
*Assistant Examiner*—Bhavesh Mehta
*Attorney, Agent, or Firm*—Steve Mendelsohn; William H. Murray

[57] ABSTRACT

A method and apparatus for characterizing the performance of either a printer used to print a two-dimensional symbol or an imaging system used to generate an gray-scale image of the printed symbol. After the image is generated, an acquisition target of the symbol is located. The quality of the acquisition target is characterized by thresholding the gray-scale image, run-length encoding the resulting binary image, and computing the correlation coefficient between the run-length-encoded image and a run-length-encoded representation of a defined acquisition target.

10 Claims, 8 Drawing Sheets

1

METHOD AND APPARATUS FOR CHARACTERIZING THE PERFORMANCE OF A PRINTER OR AN IMAGING SYSTEM

This is a continuation of application Ser. No. 08/295,142 filed on Aug. 24, 1994, now abandoned which is a continuation of application Ser. No. 08/028,308 filed Mar. 9, 1993, now abandoned.

BACKGROUND OF THE INVENTION

1. Field of the Invention

The present invention relates to two-dimensional symbologies, and, in particular, to a method and apparatus for characterizing the quality of two-dimensional symbols in pixel images.

2. Statement of Related Art

U.S. Pat. Nos. 4,874,936 (Chandler et al.) and 4,896,029 (Chandler et al.) disclose articles, processes, and systems for polygonal information encoding, whereby information is encoded in a two-dimensional symbol comprising a plurality of polygons and an acquisition target.

The '936 and '029 patents disclose a two-dimensional symbol that comprises an acquisition target with a bull's-eye pattern that conveys information for finding the symbol, and an array of differently shaded hexagons in which alphanumeric type data is encoded. Such a symbol may be printed using a printer having a resolution of about 80 to 100 pixels per inch. At this resolution, each hexagonal element of the symbol only approximates a true hexagon, as shown in FIGS. 13, 14, and 15 of the '029 patent. Printers with greater or lower resolution are able to print symbols having elements that more or less closely approximate true hexagons. The further the approximation from a true hexagon, the more errors that may occur during the process of decoding the information stored in the symbols. Thus, the printer resolution used directly affects the ability of a symbol reader to decode a symbol.

In addition, symbols may get distorted in the printing processes. Distortion in the image of a printed symbol may also be caused by the optical sensor system used to generate the image of the printed symbol. Such distortions may also lead to errors in the decoding of the printed symbol.

SUMMARY OF THE INVENTION

In a preferred embodiment, the present invention is a method and apparatus for characterizing the performance of a device. A printed symbol containing a control pattern is provided, where the printed symbol was generated with a printer. A pixel image of the printed symbol is generated with an imaging system, where the pixel image contains an imaged control pattern. The imaged control pattern is located in the pixel image. A quality measure is calculated, where the quality measure is a function of the imaged control pattern and a representation of a defined control pattern. The performance of the device is characterized in accordance with the quality measure, where the device is either the printer or the imaging system.

In an alternative preferred embodiment of the method and apparatus for characterizing the performance of a device according to the present invention, a printed symbol is provided, where the printed symbol was generated with a printer. A pixel image of the printed symbol is generated with an imaging system. An imaged symbol is located in the image. A histogram of at least a portion of the imaged symbol is generated. A quality measure is calculated in accordance with the histogram. The performance of the device is characterized in accordance with the quality measure, where the device is either the printer or the imaging system.

In another alternative preferred embodiment of the method and apparatus for characterizing the performance of a device according to the present invention, a printed symbol is provided, where the printed symbol was generated with a printer. A pixel image of the printed symbol is generated with an imaging system. An imaged symbol is located in the image. At least a portion of the imaged symbol is transformed into a frequency domain. A quality measure is calculated in accordance with the transformed portion. The performance of the device is characterized in accordance with the quality measure, where the device is either the printer or the imaging system.

It is an object of the present invention to provide a method and an apparatus for characterizing the performance of a printer used to print a two-dimensional symbol.

It is another object of the present invention to provide a method and an apparatus for characterizing the performance of an imaging system used to generate an image of a printed two-dimensional symbol.

BRIEF DESCRIPTION OF THE DRAWINGS

Other objects, features, and advantages of the present invention will become more fully apparent from the following detailed description of the preferred embodiment, the appended claims, and the accompanying drawings in which:

DETAILED DESCRIPTION OF THE INVENTION

The present invention relates to a method and apparatus for characterizing the quality of a two-dimensional symbol in a pixel image, such as those symbols disclosed in U.S. Pat. Nos. 4,874,936 (Chandler et al.) and 4,896,029 (Chandler et al.). The disclosures of the '936 and '029 patents are incorporated herein in their entireties by reference. Such a characterization may be used to measure the quality of the printer used to print the symbol or the quality of the optical sensor system used to generate the image of the printed symbol or both.

Figure 1:
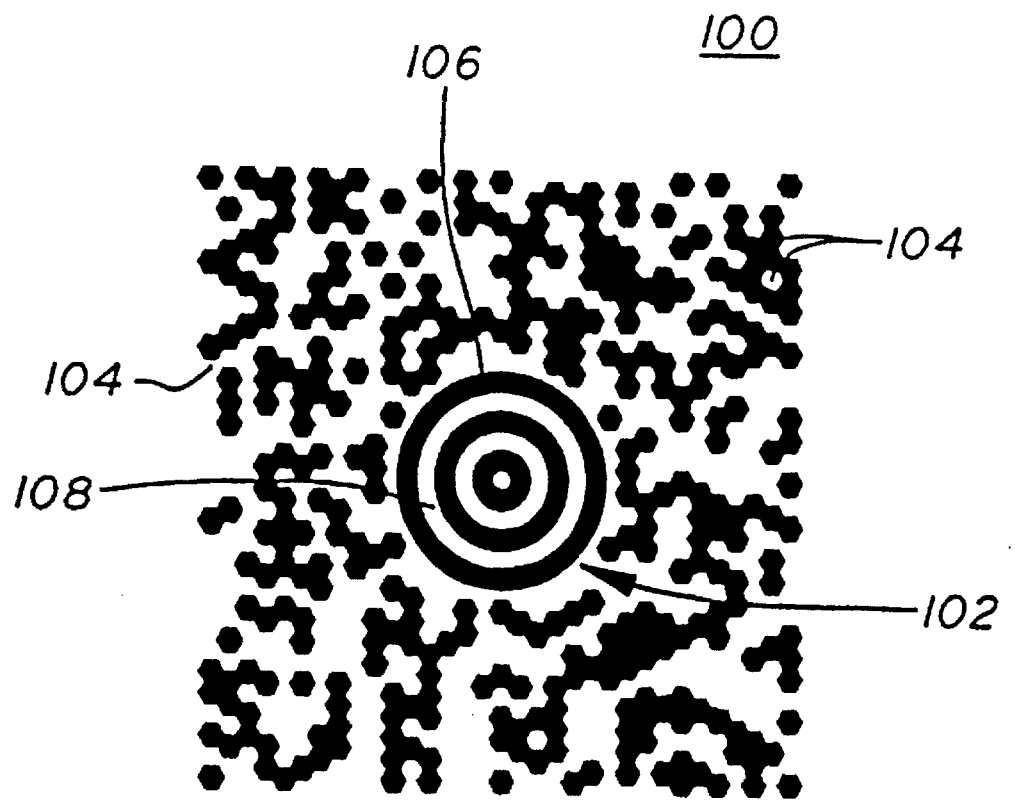
FIG. 1 is a two-dimensional symbol as disclosed in the '936 and '029 patents.

Referring now to FIG. 1, there is shown a two-dimensional symbol 100 as disclosed in the '936 and '029 patents. Symbol 100 comprises an acquisition target 102 and an array of hexagons 104. In one embodiment, information is encoded in symbol 100 in the relative shading of hexagons 104 as either white or black. Acquisition target 102, which is preferably located at the center of symbol 100, is a type of control pattern that comprises a bull's-eye pattern of three black rings 106 and three white rings 108, where the center white circle is one of the three white rings 108. A control pattern is any pattern that is known not to vary from symbol to symbol. Every acquisition target 102 is ideally the same in every symbol 100. Acquisition target 102 is therefore a control pattern.

There are several characteristics of an image of two-dimensional symbol 100 that may be used to determine the overall quality of symbol 100. For example, while the array of hexagons 104 will change, acquisition target 102 will be the same for each different symbol 100. An ideal symbol 100 has a defined acquisition target 102. One aspect of the quality of an imaged symbol 100, therefore, is how closely the imaged acquisition target 102 of an imaged symbol 100 matches the defined acquisition target 102 of an ideal symbol 100. The closer the match, the higher the quality of the imaged symbol 100.

Other aspects of the quality of an imaged symbol 100 relate to the coloring of the image. For example, in an ideal eight-bit gray-scale image of symbol 100, each pixel that corresponds to a black hexagon 104 or a black ring 106 would have a pixel intensity of 0 and each pixel that corresponds to a white hexagon 104 or a white ring 108 would have a pixel intensity of 255. In a real eight-bit gray-scale image of symbol 100, the intensities of "black" pixels will be different from 0 and different from one another. Similarly, the intensities of "white" pixels will vary from 255 over a range of values.

As a result, the quality of a real imaged symbol 100 may be determined by characterizing the difference in intensity (i.e., contrast) or separation between black and white pixels. The greater the intensity contrast or separation between black and white pixels, the higher the quality of symbol 100. The quality of symbol 100 may also be determined by characterizing the uniformity or variation of intensities within only the white or black pixels. The greater the uniformity and lower the variation within the white pixels, the higher the quality of symbol 100, and similarly for the black pixels.

Figure 2:
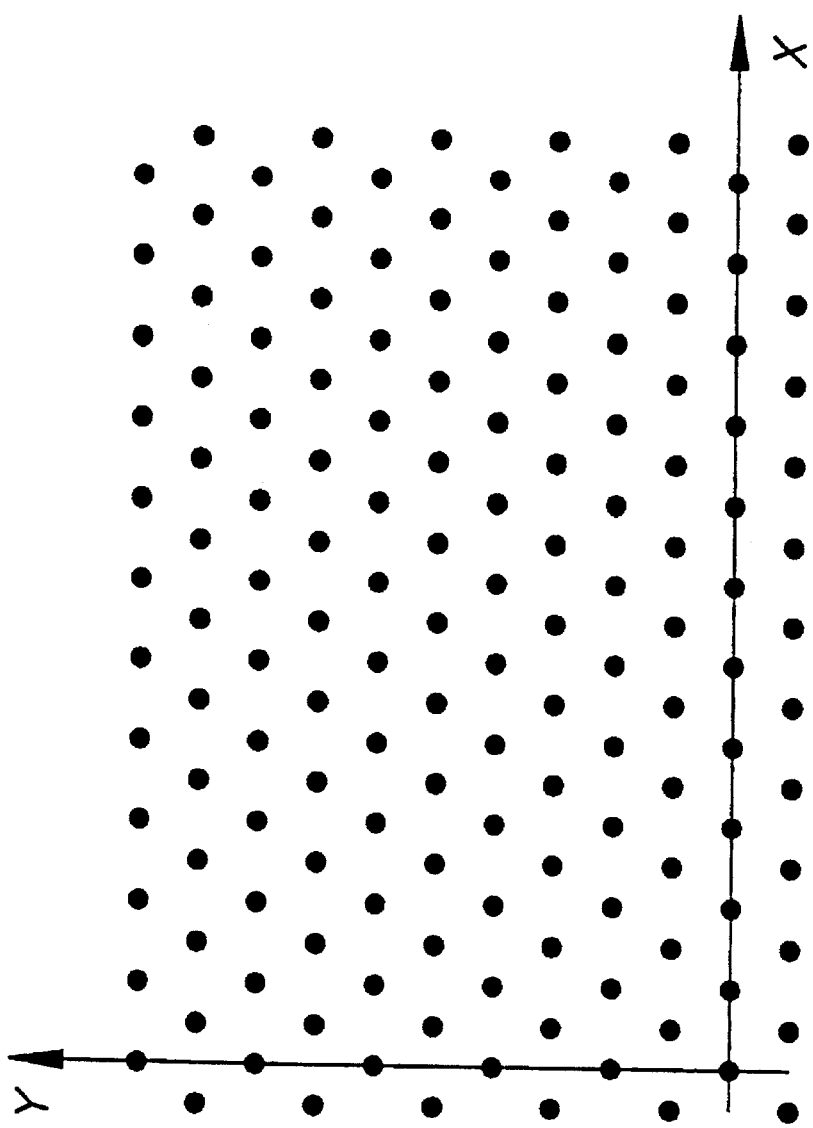
FIG. 2 shows an ideal hexagonal coordinate system.
Figure 3:
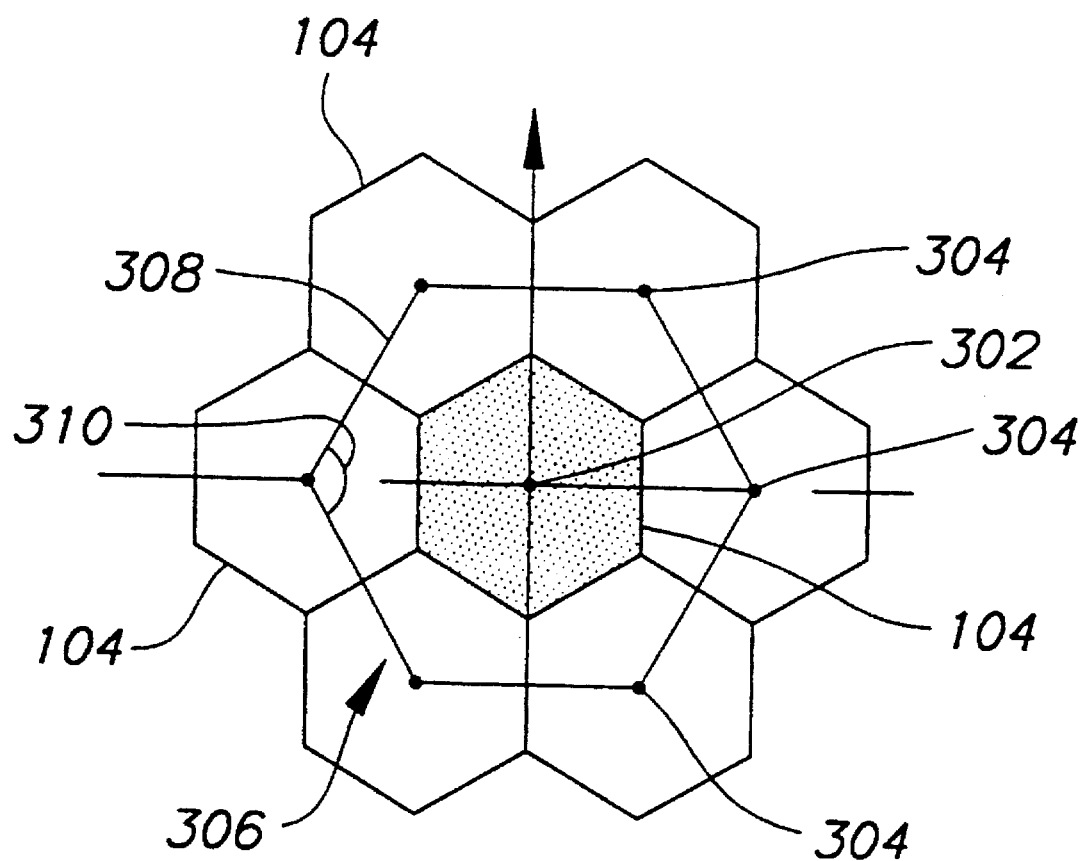
FIG. 3 shows an array of hexagons positioned to coincide with the points of an ideal hexagonal coordinate system.

Still other aspects of the quality of an imaged symbol 100 relate to the positions of hexagons 104. In an ideal symbol 100, the center of each hexagon 104 coincides with a point in an ideal hexagonal coordinate system. Referring now to FIG. 2, there is shown an ideal hexagonal coordinate system. Referring now to FIG. 3, there is shown an array of hexagons 104 positioned to coincide with the points of an ideal hexagonal coordinate system. In an ideal hexagonal coordinate system, each interior point 302 (corresponding to the center of a hexagon 104) has six nearest neighbors 304 (corresponding to the centers of six neighboring hexagons 104). The six nearest neighbors 304 define an ideal hexagon 306 having six sides 308 of equal length and six interior angles 310 of equal magnitude (i.e., 120 degrees). The quality of an imaged symbol 100 may therefore be determined by characterizing the positions of the centers of the hexagons 104 in the hexagon array.

Each of these different aspects of the quality of an imaged symbol 100 may be quantified by a different quality measure designed to characterize that aspect of symbol quality. The overall quality of an imaged symbol 100 may then be based on these different quality measures. For example, a test may be performed for each different aspect of symbol quality by comparing the associated quality measure to a specific threshold for that quality measure. The overall quality of an imaged symbol 100 may then be determined based on the results of the different tests. An imaged symbol 100 may be said to be of sufficient quality if all or a specified number or set of tests are "passed." Alternatively, a single overall symbol-quality measure may be a function of each different quality measure for each different aspect of symbol quality. This overall symbol-quality measure may then be compared to an overall symbol-quality threshold to determine whether the imaged symbol 100 is of sufficient quality.

Figure 4:
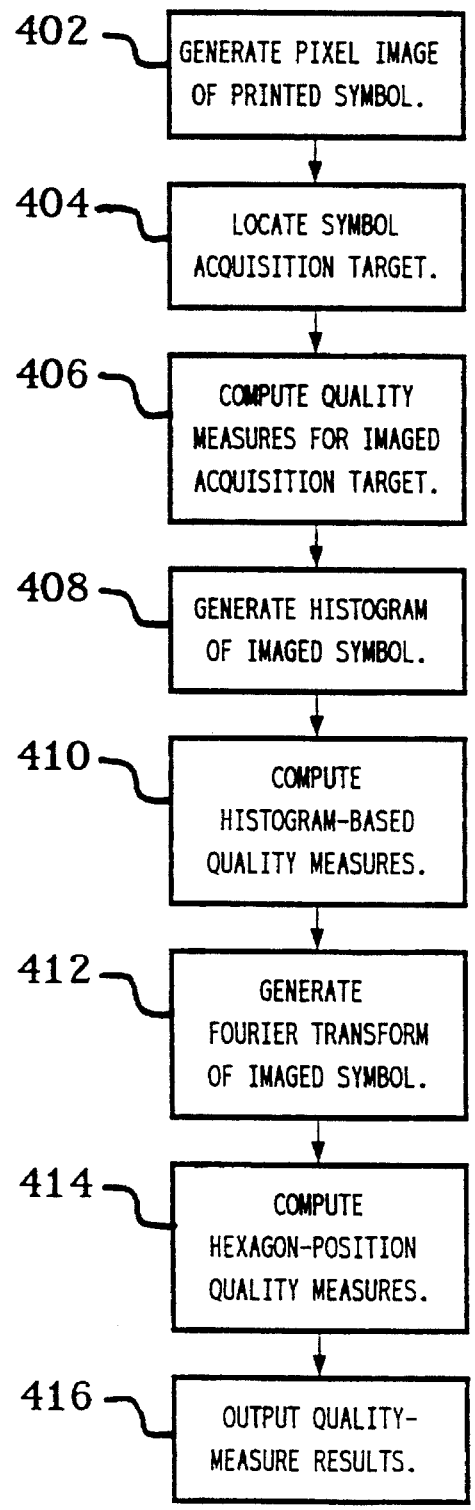
FIG. 4 shows a process flow diagram of a system for characterizing the quality of the symbol of FIG. 1 in a pixel image according to a preferred embodiment of the present invention.

Referring now to FIG. 4, there is shown a process flow diagram of system 400 for characterizing the quality of symbol 100 in a pixel image according to a preferred embodiment of the present invention. Means 402 of system 400 generates a two-dimensional gray-scale pixel image of symbol 100. Means 402 is preferably a CCD-based (i.e., charge coupled device) linear-array camera, such as a Pulnix 7-CN black/white CCD camera manufactured by Pulnix America, Inc. of Sunnyvale, Calif. 94086.

Means 404 determines the location of acquisition target 102 of symbol 100 in the pixel image. In a preferred embodiment, means 404 locates acquisition target 102 by convolving the pixel image with one or more templates that correspond to a defined acquisition target. In a preferred embodiment, means 404 uses a one-dimensional single template to locate acquisition target 102, as disclosed in the '936 and '029 patents. In another preferred embodiment, means 404 uses a double template to locate acquisition target 102, as disclosed in the U.S. Patent Application of Joe Zheng and Jiansu Lai entitled "Method and Apparatus for Locating a Two-Dimensional Symbol Using a Double Template," filed on Mar. 1, 1993, using U.S. Postal Service "Express Mail Service" Label No. HB200235244.

After locating acquisition target 102, means 404 also preferably decodes symbol 100 to verify that it is a valid symbol. If symbol 100 is valid, means 406 then characterizes the quality of the imaged acquisition target. Means 406 is described in further detail later in this specification in conjunction with FIG. 5.

Means 408 generates a histogram of the pixel intensities corresponding to the image symbol. Means 410 then computes several histogram-based quality measures of the imaged symbol. Means 410 is described in further detail later in this specification in conjunction with FIG. 6.

Means 412 applies a Fourier transform to the pixel intensities representing the imaged symbol and thereby transforms these intensity values into the frequency domain. Means 414 then computes several hexagon-position quality measures of the imaged symbol. Means 414 is described in further detail later in this specification in conjunction with FIGS. 7 and 8.

Means 416 generates an output of the results of the quality measures of the imaged acquisition target and symbol. This output is preferably in the form of a screen display and/or hard copy print-out, as selected by the user.

Characterization of Quality of Acquisition Target

Figure 5:
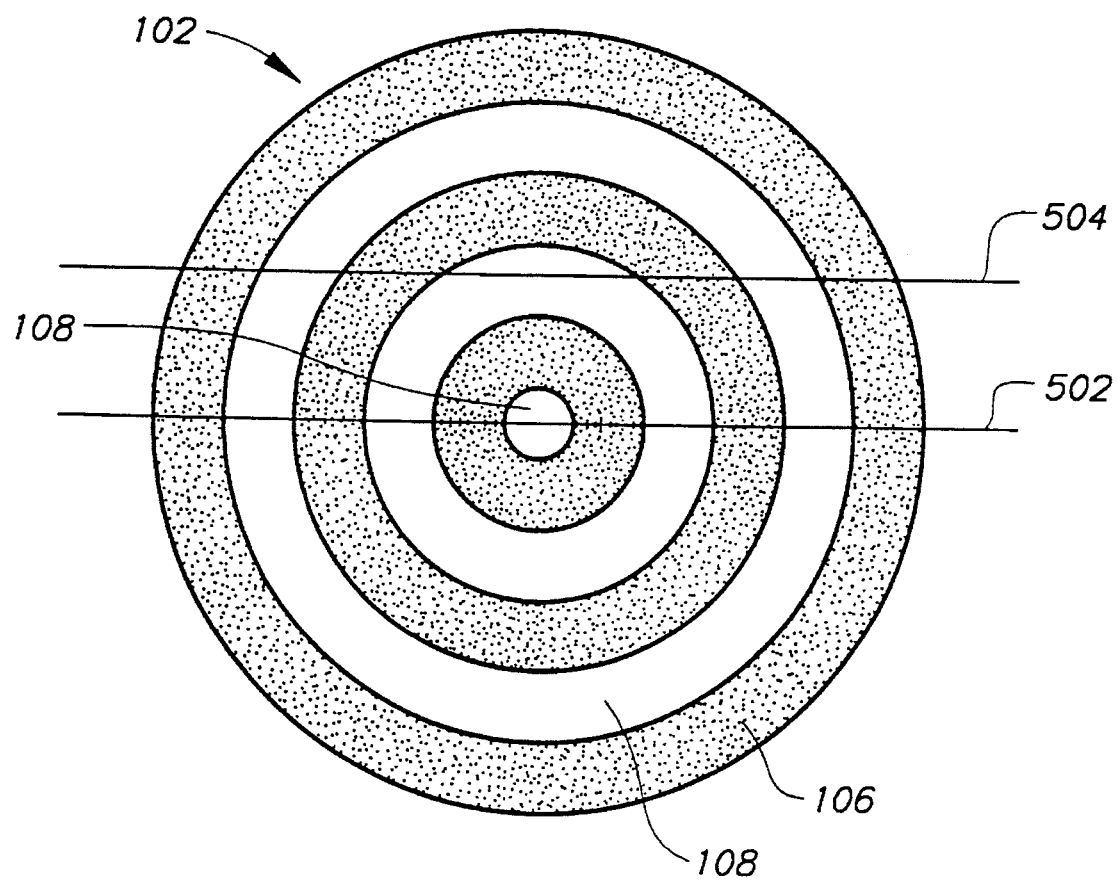
FIG. 5 shows the acquisition target of the symbol of FIG. 1.

Referring now to FIG. 5, there is shown acquisition target 102 of symbol 100. Acquisition target 102 comprises a bull's-eye pattern of three black rings 106 and three white rings 108, where the center white circle is one of the three white rings 108. According to a preferred embodiment of the present invention, the quality measure of the imaged acquisition target is determined through the analysis of a gray-scale image representing the acquisition target. This gray-scale image is thresholded to generate a binary image representative of the acquisition target. That binary image is then run-length encoded.

In a preferred embodiment, the gray-scale image of the acquisition target is thresholded using a global threshold value GT. Those skilled in the art will understand that the global threshold value GT may be selected in various ways. In a preferred embodiment, the global threshold value GT is based on a $\Phi$n entropy criterion (s), where $\Phi(s)$ is given by Equation (1) below:

$$\Phi(s) = \ln[p_s(1-p_s)] + \frac{E_s}{p_s} + \frac{(E_M - E_s)}{(1-p_s)}, \quad (1)$$

where $p_s$ is the probability that gray level s occurs in the image and may be determined from a histogram of the image and $E_s$ is the entropy at gray level s, where gray level runs from 0 to M (the maximum gray level in the image). The entropy $E_s$ at gray level s is given by Equation (2) below:

$$E_s = -\sum_{i=1}^{s} p_i \ln p_i, \quad (2)$$

where $p_i$ is the probability of gray level i. The entropy criterion $\Phi(s)$ is determined for each gray-level value s from 0 to M. The global threshold value GT is then set equal to the value of s that corresponds to the maximum value of entropy criterion $\Phi(s)$.

The image is thresholded by comparing each pixel intensity value to the global threshold value GT. If the pixel intensity value is greater than the global threshold value GT, then the thresholded pixel is assigned a value of "1" representing a white pixel; otherwise, the thresholded pixel is assigned a value of "0" representing a black pixel.

In run-length encoding, a sequence of pixels in the binary pixel image are represented by their run-length-encoded values. For example, assume that FIG. 5 is a binary image representative of acquisition target 102 in which a white pixel is represented by a "1" and a black pixel is represented by a "0." In a preferred embodiment, the binary image of FIG. 5 is generated by thresholding a gray-scale image. Pixel row 502 running through the center of acquisition target 102 may have the following pixel sequence from left to right and starting with the first black pixel:

(00000111110000011111000001111100000111110000011111100000), where each black ring 106 and each white ring 108 has a width of five pixels in the pixel image. According to a preferred embodiment of the present invention, pixel row 502 may be represented by run-length encoding the pixel sequence as:

(10,5,5,5,5,5,5,5,5,5,5,5), where the first entry is the number of black-to-white and white-to-black transitions along row 502 and each successive number is the number of consecutive white or black pixels in pixel row 502 from left to right and starting with the first black pixel.

As another example, pixel row 504 may have the following pixel sequence:

(000001111110000000111111111111111110000000111111100000).

According to the present invention, pixel row 504 is represented as the run-length-encoded sequence:

(6,5,6,7,17,7,6,5), where there are six black-to-white and white-to-black transitions and sequences of consecutive black and white pixels as listed.

Means 406 applies this run-length encoding process to transform the binary image of the acquisition target 102 into a gray-scale "transformed image," where each row of the transformed image comprises the results of run-length-encoding the corresponding row of the binary image. The transformed image has as many rows as the binary image, but will typically have fewer columns. Moreover, the number of pixels in the rows of the transformed image will typically vary from row to row. In the above examples, transformed row 502 has twelve pixels while transformed row 504 has only eight pixels.

Means 406 generates a quality measure from the run-length-encoded transformed image of the acquisition target (located by means 404) and a run-length-encoded representation of a defined acquisition target (generated off-line). In a preferred embodiment of the present invention, this quality measure is the correlation coefficient $\rho(i,j)$ between the two run-length-encoded images. This correlation coefficient $\rho(i,j)$ is determined using Equation (3) below:

$$\rho(i,j) = \frac{C_{ft}(i,j)}{\sqrt{\sigma_f(i,j)\sigma_t}}, \quad (3)$$

where $C_{ft}(i,j)$ is the cross-correlation or cross-variance between the run-length-encoded imaged acquisition target and the run-length-encoded defined acquisition target; $\sigma_f(i,j)$ is the auto-correlation or auto-variance of the run-length-encoded imaged acquisition target; and $\sigma_t$ is the auto-correlation or auto-variance of the run-length-encoded defined acquisition target. $C_{ft}(i,j)$, $\sigma_f(i,j)$, and $\sigma_t$ are determined in accordance with Equations (4)–(6) below:

$$C_{ft}(i,j) = \sum_{y=0}^{N} \sum_{x=0}^{M} \left[ f\left(x+i-\frac{M}{2}, y+j-\frac{N}{2}\right) - \bar{f}(i,j) \right] [t(x,y) - \bar{t}] \quad (4)$$

$$\sigma_f(i,j) = \sum_{y=0}^{N} \sum_{x=0}^{M} \left[ f\left(x+i-\frac{M}{2}, y+j-\frac{N}{2}\right) - \bar{f}(i,j) \right]^2 \quad (5)$$

$$\sigma_t = \sum_{y=0}^{N} \sum_{x=0}^{M} [t(x,y) - \bar{t}]^2 \quad (6)$$

where $f(x+i-M/2, y+j-N/2)$ is the pixel intensity value at row $x+i-M/2$ and column $y+j-N/2$ of the image of the run-length-encoded imaged acquisition target, $\bar{f}(i,j)$ is the average pixel intensity value of the run-length-encoded imaged acquisition target, $t(x,y)$ is the pixel intensity value at row x and column y of the image of the run-length-encoded defined acquisition target, and $\bar{t}$ is the average pixel intensity value of the run-length-encoded defined acquisition target. $\bar{f}(i,j)$, and $\bar{t}$ are determined in accordance with Equations (7) and (8) below:

$$\bar{f}(i,j) = \frac{1}{N \times M} \sum_{y=0}^{N} \sum_{x=0}^{M} f\left(x+i-\frac{M}{2}, y+j-\frac{N}{2}\right) \quad (7)$$

$$\bar{t} = \frac{1}{N \times M} \sum_{y=0}^{N} \sum_{x=0}^{M} t(x,y) \quad (8)$$

where M is the number of rows and N is the number of columns in the image of the run-length-encoded defined acquisition target and (i,j) is the location of the imaged acquisition target in the run-length-encoded transformed image.

The correlation coefficient $\rho(i,j)$ will have a value between −1 and 1, where 1 corresponds to a perfect match between the defined acquisition target and the imaged acquisition target. Therefore, the higher the correlation coefficient ρ(i,j), the better the match between the defined and imaged acquisition targets and the higher the quality of the imaged acquisition target for this aspect of image quality. Determining the quality measure from the correlation coefficient ρ(i,j) (rather than the cross-correlation $C_{fl}(i,j)$) provides a relative measure of the quality of the imaged acquisition target with respect to the defined acquisition target.

Using run-length-encoded images reduces the computational complexity of calculating the correlation coefficient ρ(i,j) by reducing the dimensions of the images used in the computation.

In addition to the correlation coefficient ρ(i,j), the horizontal and vertical dimensions of the imaged acquisition target are determined. The horizontal dimension of the imaged acquisition target is the distance across the target along the pixel row through the center of the target. The vertical dimension of the imaged acquisition target is the distance across the target along the pixel column through the center of the target. In an ideal symbol, the horizontal and vertical dimensions are equal to each other and to the dimension of the defined acquisition target. Differences between these dimensions may indicate errors in the printing process, for example, in the paper feeding mechanism of the printer.

Those skilled in the art will understand that system 400 of the present invention may be designed to characterize the quality of control patterns other than the acquisition target of symbol 100.

Histogram-Based Quality Measures

As referred to earlier in this specification in conjunction with FIG. 4, means 408 of system 400 generates a histogram of the pixel intensity values of the gray-scale pixel image of symbol 100. Means 410 then computes histogram-based quality measures that characterize aspects of the quality of that image.

Figure 6:
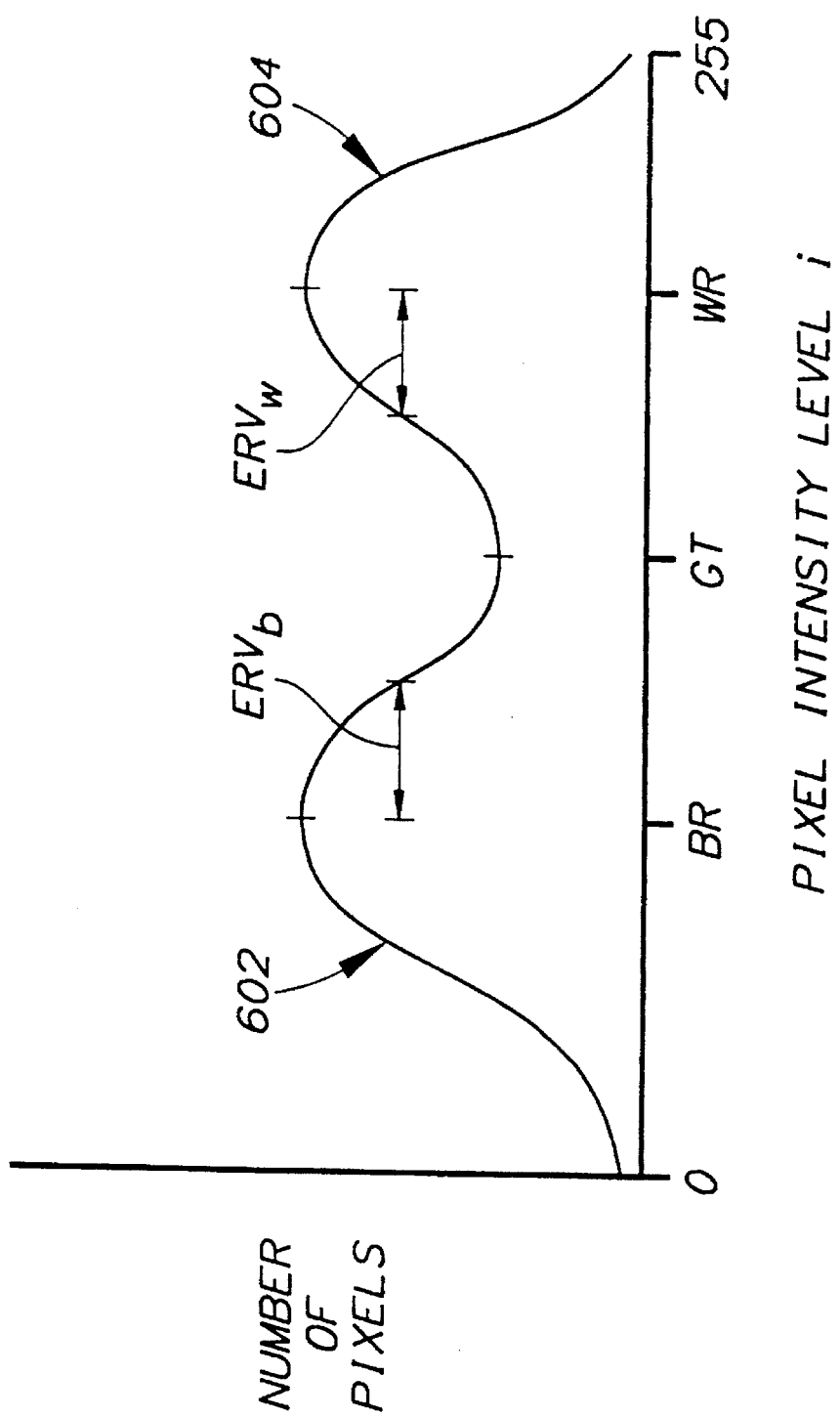
FIG. 6 shows the histogram of an eight-bit gray-scale pixel image of the symbol of FIG. 1.

Referring now to FIG. 6, there is shown a histogram of an eight-bit gray-scale pixel image of symbol 100. As indicated in FIG. 6, the image pixels are clustered in two intensity regions—region 602 corresponding to black pixels and region 604 corresponding to white pixels. The black reflectance value (BR) is the pixel intensity level corresponding to the peak of black-pixel region 602 (i.e., the black-pixel intensity value that occurs the most times in the pixel image). Similarly, the white reflectance value (WR) is the pixel intensity level corresponding to the peak of white-pixel region 604 (i.e., the white-pixel intensity value that occurs the most times in the pixel image). The global threshold value (GT) generated using Equation (1) above is also depicted in FIG. 6. This value may be used to distinguish white pixels from black pixels in the histogram of FIG. 6.

In a preferred embodiment, means 410 computes a symbol contrast value (SC) from the white reflectance WR and the black reflectance BR values, according to Equation (9):

$$SC = \frac{WR - BR}{WR + BR} \times 100\%. \quad (9)$$

The symbol contrast value SC indicates the contrast between the reflectances of the black and white pixels. The higher the symbol contrast value SC, the higher the quality of the image of symbol 100 for the pixel-contrast aspect of symbol quality.

Means 410 also computes element reflectance uniformity values ERU for both the black and white pixels, according to Equations (10) and (11) below:

$$ERU_b = \frac{H(BR)}{\sum_{i=0}^{GT} H(i)} \quad (10)$$

$$ERU_w = \frac{H(WR)}{\sum_{i=GT+1}^{255} H(i)}, \quad (11)$$

where H(BR) and H(WR) are the histogram values at the black reflectance value BR and white reflectance value WR, respectively. The denominator for Equation (10) is the sum of the histogram values H(i) at the intensity values i for the black pixels (i.e., those pixels with intensity values less than or equal to the global threshold value GT). Similarly, the denominator for Equation (11) is the sum of the histogram values H(i) at the intensity values i for the white pixels (i.e., those pixels with intensity values greater than the global threshold value GT). The element reflectance uniformity values $ERU_b$ and $ERU_w$ indicate, respectively, the uniformity of the black and white pixels. The higher the element reflectance uniformity value, the higher the pixel-uniformity aspect of the quality of the image of symbol 100. An ideal image of symbol 100 has element reflectance uniformity values of 1.

In addition, means 410 computes element reflectance variance values (ERV) for both the black and white pixels, according to Equations (12) and (13) below:

$$ERV_b = \sum_{i=0}^{GT} [(i - \bar{i}_b)^2 \times p_i] \quad (12)$$

$$ERV_w = \sum_{i=GT+1}^{255} [(i - \bar{i}_w)^2 \times p_i] \quad (13)$$

where $p_i$ is the probability of pixel intensity i and is determined according to Equation (14) below:

$$p_i = \frac{H(i)}{\sum_{i=0}^{255} H(i)}. \quad (14)$$

$\bar{i}_b$ and $\bar{i}_w$ are the mean values of the black and white pixels and are determined according to Equations (15) and (16) below:

$$\bar{i}_b = \sum_{i=0}^{GT} [i \times p_i] \quad (15)$$

$$\bar{i}_w = \sum_{i=GT+1}^{255} [i \times p_i]. \quad (16)$$

The element reflectance variance values $ERV_b$ and $ERV_w$ indicate respectively, the variance within the black and white pixels. The lower the element reflectance variance, the higher the pixel-variation aspect of the quality of the image of symbol 100. An ideal image of symbol 100 has element reflectance variance values of 0. The element reflectance variance values can indicate how a printer changes tone during the printing of symbol 100.

Means 410 also computes the minimum reflectance difference (MRD), according to Equation (17) below:

$$MRD = \frac{(WR - ERV_w) - (BR + ERV_b)}{(WR - BR)}, \quad (17)$$

where (WR−$ERV_w$) is defined as the intensity of a dark white pixel and (BR+$ERV_b$) is defined as the intensity of a bright black pixel, as indicated in FIG. 6. BR and WR are the black and white reflectance values, respectively, and $ERV_b$ and $ERV_w$ are the black and white element reflectance variance values, according to Equations (12) and (13) above, respectively.

The minimum reflectance difference MRD indicates the separation between the black and white pixels. The higher the value of MRD, the greater the pixel-separation aspect of the quality of the image of symbol 100. In an ideal image of symbol 100, $ERV_b$ and $ERV_w$ are both zero and the minimum reflectance difference MRD is 1.0.

Hexagon-Position Quality Measures

As described earlier in this specification in conjunction wit FIGS. 2 and 3, aspects of the quality of an imaged symbol 100 relate to the positioning of the centers of hexagons 104 in the hexagon array. System 400 determines quality measures of the positioning of hexagons 104 using Fourier analysis. As referred to earlier in this specification in conjunction with FIG. 4, means 412 of system 400 transforms a portion of the gray-scale pixel image of symbol 100 that does not contain acquisition target 102 (i.e., a portion of the image of symbol 100 comprising only hexagons 104). Means 412 transforms that hexagon-only portion of the image into the frequency domain using a fast Fourier transform (FFT) algorithm. Using the FFT results, means 414 computes hexagon-position quality measures that indicate the positioning of the centers of hexagons 104 in the hexagon array.

Figure 7:
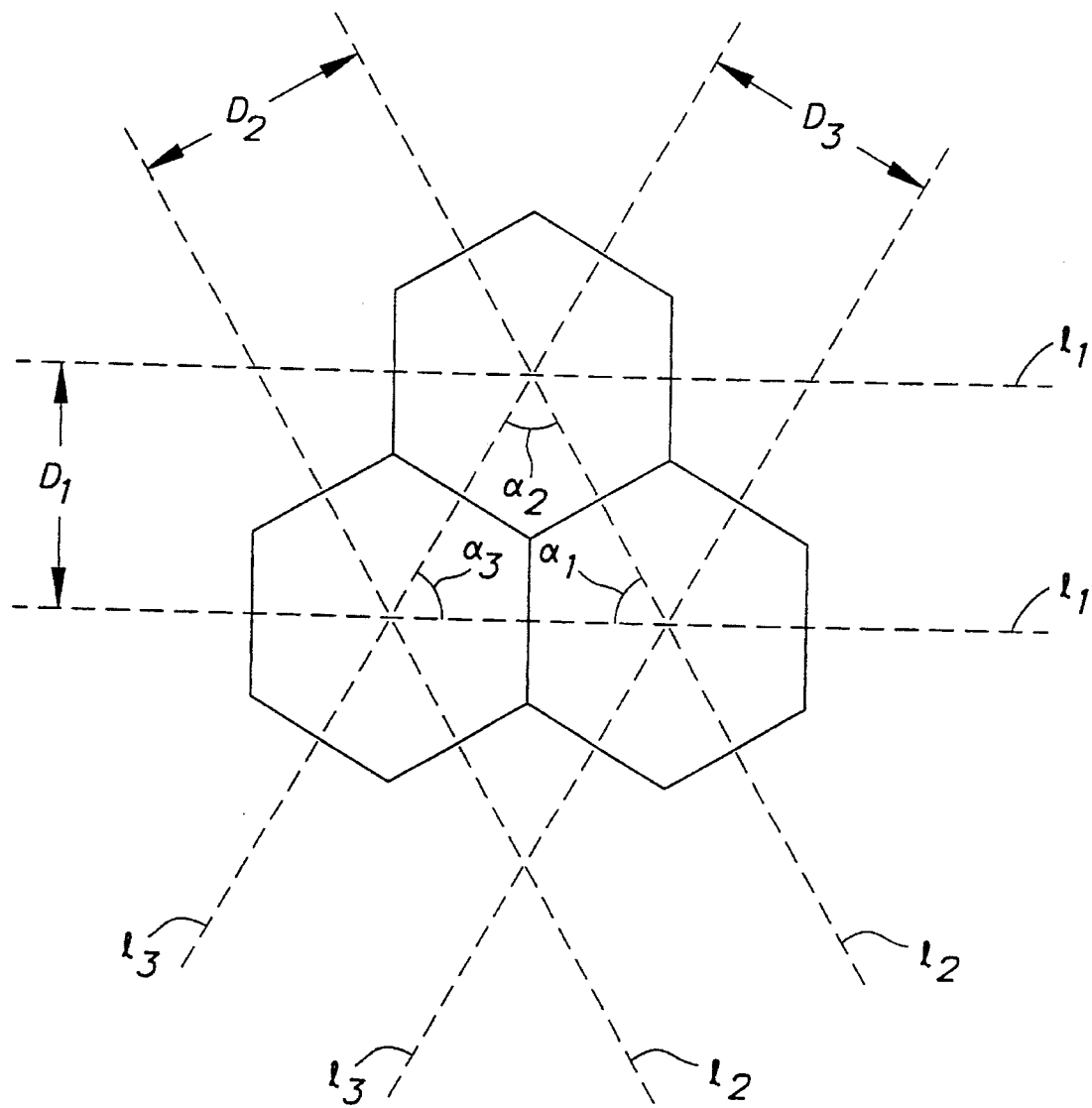
FIG. 7 shows a portion of the symbol of FIG. 1 that comprises only hexagons.

Referring now to FIG. 7, there is shown a portion of the image of symbol 100 comprising only hexagons 104. In FIG. 7, lines $l_1$, $l_2$, and $l_3$ correspond to the three axes of the hexagonal array, angles $\alpha_1$, $\alpha_2$, and $\alpha_3$ correspond to the angles between those axes, and distances $D_1$, $D_2$, and $D_3$ correspond to the perpendicular distances between the centers of hexagons 104 relative to those axes. For example, angle $\alpha_1$ is the angle between lines $l_1$ and $l_2$ and distance $D_1$ is the perpendicular distance between the centers of hexagons 104 relative to line $l_1$. In a perfect image of ideal hexagons, the angles $\alpha_1$, $\alpha_2$, and $\alpha_3$ are all 60 degrees and the distances $D_1$, $D_2$, and $D_3$ are all equal.

Figure 8:
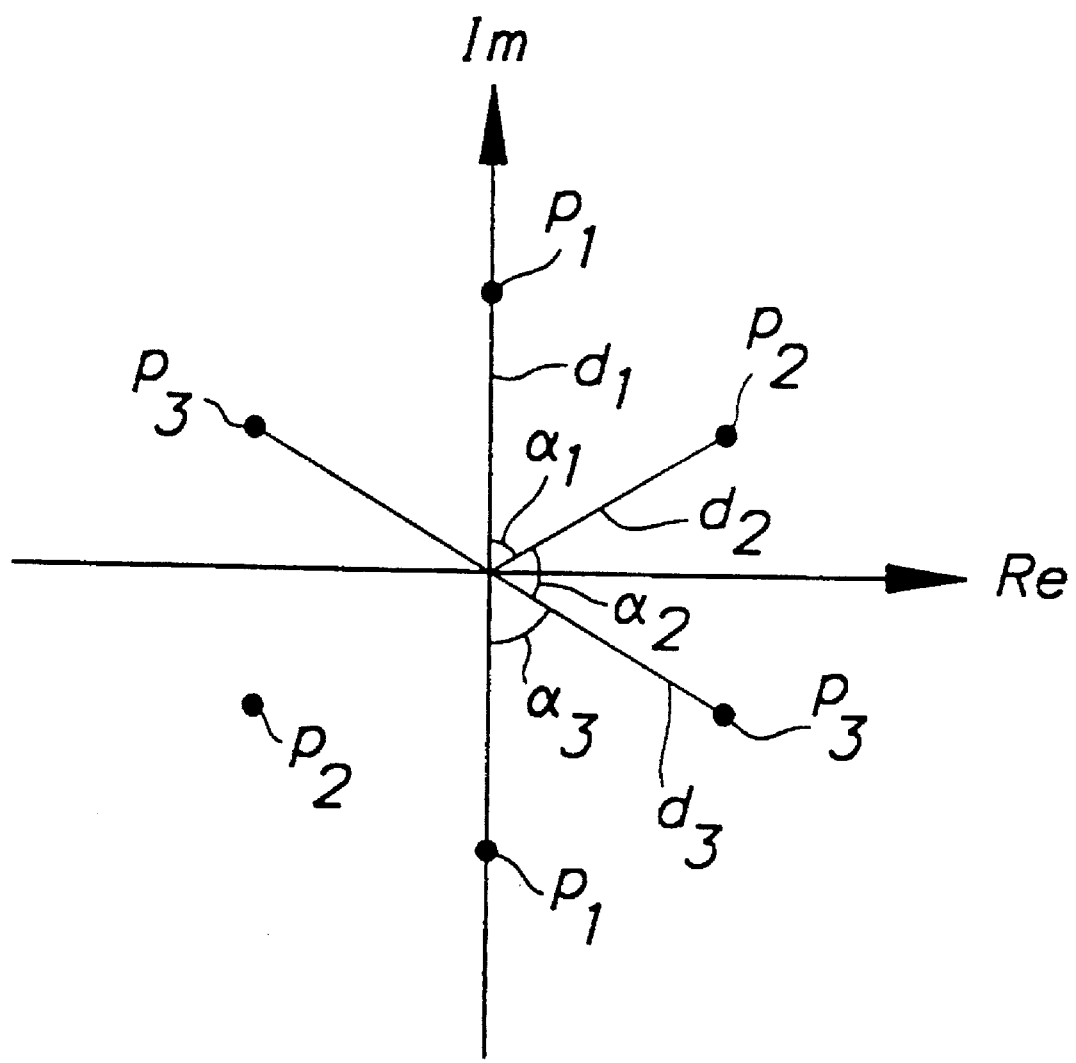
FIG. 8 show a graphical representation of the results of transforming the portion of FIG. 7 into the frequency domain using a fast Fourier transform algorithm.

Referring now to FIG. 8, there is shown a graphical representation of the results of transforming a perfect image of ideal hexagons into the frequency domain using an FFT algorithm. In the frequency domain, a perfect image of hexagons that coincide with points of a hexagonal coordinate system is represented by three pairs of points $p_1$, $p_2$, and $p_3$ that correspond to the frequency of change within the hexagon grid of symbol 100. The angles $\alpha_1$, $\alpha_2$, and $\alpha_3$ between the lines connecting the pairs of points $p_1$, $p_2$, and $p_3$ are the same angles $\alpha_1$, $\alpha_2$, and $\alpha_3$ depicted in FIG. 7. For example, angle $\alpha_1$ is the angle between the line connecting points $p_1$ and the line connecting points $p_2$. Deviations in the values of angles $\alpha_1$, $\alpha_2$, and $\alpha_3$ from 60 degrees indicates imperfections in the positioning of hexagons 104 in the image of printed symbol 100. These deviations are called element angle (EA) deviations and are computed by means 414.

In addition, means 414 computes element position (EP) deviations based on the distances $d_1$, $d_2$, and $d_3$ in the frequency domain. The distances $d_1$, $d_2$, and $d_3$ are the distances in the frequency domain from the origin to points $p_1$, $p_2$, and $p_3$, respectively. The distances $d_1$, $d_2$, and $d_3$ in the frequency domain can be converted to the spatial domain by dividing by N, the number of samples used in the FFT algorithm. These converted distances are then compared to distances $D_1$, $D_2$, and $D_3$ from FIG. 7 to determine an element position EP deviation for each axis. The smaller the element position deviations, the higher this hexagon-geometry aspect of the quality of the image of symbol 100.

Those skilled in the art will understand that the element angle EA and element position EP measures are global quality measures that determine overall distortions in the positioning of hexagons 104 of symbol 100. A small number of misplaced hexagons 104, relative to the total number of hexagons 104 analyzed, may not significantly affect these quality measures.

Characterizing Printer Performance

In accordance with the present invention, the performance of a printer can be characterized to determine if the printed symbols produced by the printer meet a specified minimum print quality. The present invention may therefore be employed to analyze the printing performance of any commercially available (or even custom) label printer, such as UBI Printer 201 of UBI Printer AB, Box 123, S-431, 22 Molndal, Sweden. In such an application, it is preferable to attempt to reduce and/or account for any effects that the optical sensor system may have on the quality of the image of the printed symbol. In a preferred embodiment, the optical sensor system is a CCD-based linear-array camera, such as a Pulnix 7-CN black/white CCD camera manufactured by Pulnix America, Inc. of Sunnyvale, Calif. 94086.

For example, the optical sensor may introduce random noise into the pixel image of a printed symbol. This image noise may result from noise in the CCD array and/or in the video transmission lines that transmit the outputs of the CCD array. In a preferred embodiment, means 402 of system 400 reduces this noise by generating a number of pixel images of the printed label and then averaging them together. When the noise is random and has an autocorrelation of zero, such averaging will improve the signal-to-noise ratio of the resulting image. In a preferred embodiment, means 402 averages four to eight images together to form an average image of symbol 100.

Another effect that the optical sensor may have on the images of printed symbols is known as optical distortion which may be caused, for example, by optical lens error and/or imperfect geometry in the CCD array. In a preferred embodiment of the present invention, means 402 corrects the optical distortions created by the optical sensor by transforming the images according to a pre-determined transformation. The optical distortion can be modeled mathematically off line by analyzing images of known patterns to generate the transformation used to remove the effects of that optical distortion. For example, one known pattern may be a rectangular grid of points separated by known distances. The transformation may then be generated by analyzing the distances between points in the images of that known pattern generated with the optical sensor.

In an alternative embodiment, means 406 determines the quality of an imaged acquisition target; using a pre-distorted defined acquisition target. That is, rather than correcting the image of the acquisition target of the printed symbol for the known distortions caused by the optical sensor, means 406 uses a defined acquisition target that is pre-distorted off line according to those known distortions. By avoiding a real-time transformation to remove the known distortion from the imaged acquisition target, the processing time of means 406 may be reduced. As described earlier in this specification in conjunction with FIG. 5, the imaged acquisition target and the pre-distorted defined acquisition target are still run-length-encoded before computing the correlation coefficient.

Those skilled in the art will understand that the present invention may be used to characterize the performance of an imaging system used to generate images of printed symbols.

In this application of the present invention, it is preferable to attempt to reduce and/or account for any effects that the printer used to print the symbol may have on the quality of the image of the printed symbol. In characterizing the performance of either device (i.e., a printer or an imaging system), the present invention is used to determine the quality of images of printed symbols. The user may then determine whether any quality deviations (as indicated by one or more quality measures) are the result of the printer used to print the symbol or the imaging system used to generate the image of the printed symbol.

The present invention is preferably implemented in software in C language running on a digital signal processing (DSP) chip, such as a C-30 manufactured by Texas Instruments, Inc. of Houston, Tex.

Those skilled in the art will understand that features of the present invention may be used characterize the quality of symbols other than those of disclosed in the '936 and '029 patents. For example, an alternative preferred embodiment of the present invention may be used to characterize the quality of images of symbols of a two-dimensional symbology having rectangular or triangular data-encoding elements. In addition, features of the present invention may be used to characterize the quality of one-dimensional symbols such as bar code symbols.

Those skilled in the art will also understand that quality measures other than those specifically described in this specification fall within the scope of the present invention. For example, histogram-based and hexagon-position quality measures other than those described in this specification fall within the scope of the present invention. In addition, there are quality measures that are not histogram-based or hexagon-position quality measures that fall within the scope of the present invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for characterizing the performance of a device, comprising the following steps:

(a) providing a printed symbol containing a control pattern, said printed symbol having been generated with a printer;

(b) generating a pixel image of said printed symbol with imaging means, wherein said pixel image contains an imaged control pattern;

(c) locating said imaged control pattern in said pixel image using a computer processor;

(d) run-length encoding said imaged control pattern using the computer processor to generate a run-length-encoded imaged control pattern;

(e) calculating a quality measure using the computer processor, said quality measure being a function of said run-length-encoded imaged control pattern and a run-length-encoded representation of a defined control pattern; and (f) characterizing the performance of said device in accordance with said quality measure using the computer processor, wherein said device is one of said printer and said imaging means.

2. The method of claim 1, wherein said quality measure comprises a correlation coefficient between said run-length-encoded imaged control pattern and said run-length-encoded representation.

3. The method of claim 1, wherein step (c), comprises the steps of:

(1) thresholding said imaged control pattern to generate a binary imaged control pattern; and (2) run-length encoding said binary imaged control pattern to generate said run-length-encoded imaged control pattern.

4. The method of claim 1, wherein said run-length-encoded representation of said defined control pattern is a pre-distorted run-length-encoded representation of said defined control pattern.

5. The method of claim 1, wherein step (d) comprises the steps of:

(1) generating a representation of said defined control pattern;

(2) distorting said representation;

(3) run-length encoding said distorted representation to generate a run-length encoded distorted representation;

(4) if said imaged control pattern is not a binary image, then thresholding said imaged control pattern to generate a binary imaged control pattern; and (5) run-length encoding said binary imaged control pattern, wherein said run-length-encoded imaged control pattern is a run-length-encoded binary imaged control pattern; and wherein:

the function is a correlation coefficient between said run-length-encoded binary imaged control pattern and said run-length-encoded distorted representation.

6. An apparatus for characterizing the performance of a device, comprising:

(a) imaging means for generating pixel images; and (b) a computer processor, wherein:

the imaging means generates a pixel image of a printed symbol, said printed symbol having been generated with a printer and said pixel image containing an imaged control pattern;

the computer processor locates said imaged control pattern in said pixel image;

the computer processor run-length encodes said imaged control pattern to generate a run-length-encoded imaged control pattern;

the computer processor calculates a quality measure, said quality measure being a function of said run-length-encoded imaged control pattern and a run-length-encoded representation of a defined control pattern; and the computer processor characterizes the performance of said device in accordance with said quality measure, wherein said device is one of said printer and said imaging means.

7. The apparatus of claim 6, wherein said quality measure comprises a correlation coefficient between said run-length-encoded imaged control pattern and said run-length-encoded representation.

8. The apparatus of claim 6, wherein said computer processor:

thresholds said imaged control pattern to generate a binary imaged control pattern; and run-length encodes said binary imaged control pattern to generate said run-length-encoded imaged control pattern.

9. The apparatus of claim 6, wherein said computer processor calculates said quality measure, said quality measure being a function of said run-length-encoded imaged control pattern and a pre-distorted run-length-encoded representation of said defined control pattern.

10. The apparatus of claim 6, wherein said computer processor:

generates a representation of said defined control pattern;

distorts said representation;

run-length encodes said distorted representation;

thresholds said imaged control pattern to generate a binary imaged control pattern, if said imaged control pattern is not a binary image;

run-length encodes said binary imaged control pattern; and calculates said quality-measure value, said quality measure comprising a correlation coefficient between said run-length-encoded binary imaged control pattern and said run-length-encoded distorted representation.

* * * * *